United States Patent [19]

Harada et al.

[11] Patent Number: 4,662,721

[45] Date of Patent: May 5, 1987

[54] FERRO-ELECTRIC LIQUID CRYSTAL ELECTRO-OPTICAL DEVICE

[75] Inventors: Takamasa Harada; Masaaki Taguchi; Kokichi Ito, all of Tokyo, Japan

[73] Assignee: Seiko Instruments & Electronics Ltd., Tokyo, Japan

[21] Appl. No.: 750,092

[22] Filed: Jun. 28, 1985

[30] Foreign Application Priority Data

Jul. 10, 1984 [JP] Japan ................. 59-142944
Oct. 15, 1984 [JP] Japan ................. 59-215366
Apr. 12, 1985 [JP] Japan ................. 60-77783

[51] Int. Cl.⁴ ............................. G02F 1/13
[52] U.S. Cl. ............................. 350/339 R
[58] Field of Search ......... 350/330, 337, 339, 340, 350/341, 345, 348, 350

[56] References Cited

U.S. PATENT DOCUMENTS

| 3,930,716 | 1/1976 | Robert .................. 350/350 S X |
| 3,941,454 | 3/1976 | Maezawa ................ 350/334 |
| 4,030,997 | 6/1977 | Miller et al. ........... 350/340 X |
| 4,165,922 | 8/1979 | Morrissy ............... 350/340 X |
| 4,257,682 | 3/1981 | Suzuki et al. .......... 350/340 X |
| 4,264,148 | 4/1981 | Göbl-Wunsch et al. ... 350/350 S X |

FOREIGN PATENT DOCUMENTS

| 101914 | 8/1980 | Japan .................. 350/343 |
| 163219 | 10/1982 | Japan .................. 350/337 |

Primary Examiner—Donald A. Griffin
Attorney, Agent, or Firm—Robert E. Burns; Emmanuel J. Lobato; Bruce L. Adams

[57] ABSTRACT

A ferro-electric liquid crystal electro-optical device comprising two plates having electrodes, and ferro-electric liquid crystals, for example, chiral smectic crystals, sandwiched between the plates. The inner surface of one of the two plates has a uni-axial alignment characteristic which aligns the liquid crystal molecules in its uni-axial direction. The inner surface of the other plate has a random homogeneous characteristic which aligns the molecules nearly parallel to the plates but does not let the molecules have any predetermined directional characteristic.

19 Claims, 9 Drawing Figures

FERRO-ELECTRIC LIQUID CRYSTAL ELECTRO-OPTICAL DEVICE

BACKGROUND OF THE INVENTION

The present invention relates to a liquid crystal electro-optical device utilizing chiral smectic liquid crystals.

Liquid crystals are utilized in many kinds of electro-optical devices such as display devices, shutter arrays for printers and shutters for cameras, because liquid crystals have many excellent characteristics such as being small and thin, and their electric consumption being low.

Recently, liquid crystal panels utilizing ferro-electric liquid crystals such as those of chiral smectic C phase (hereinafter stated as Sm C*) have received attention as electro-optical devices having such effects as high-speed response ability and memorizing characteristic.

One of the well known liquid crystals which has this chiral smectic C phase, is, for example, 2-methyl butyl P-[(P-n-decyloxy benzylidene)amino]. As shown in FIG. 3, this liquid crystal is oriented in one direction, with a spiral structure twisted in each layer unit.

When this Sm C* is poured into a gap between two plates B, the gap being about 1 μm, smaller than the spiral period (usually several μm) (see FIG. 4a), the liquid crystal molecule loses its spiral structure, the molecule axis becomes parallel to the plate, and is oriented so that the molecules are inclined θ from the normal direction of the layers.

Therefore, the liquid crystal poured into the cell has two conditions in two domains, one domain which is inclined +θ degrees in a clock-wise direction from the normal line of the layer, and the other domain which is inclined −θ degrees in a counter-clock-wise direction, as shown in FIG. 5.

A Sm C* liquid crystal molecule has an electric dipole vertical to the molecule axis, and when in one domain the electric dipole points upwardly to the cell plate, in the other domain the electric dipole points downwardly. Therefore, when an electric field is applied between the cell plates, the liquid crystal molecules inside the cell are oriented either +θ or −θ inclined from the normal direction of the layer, and when the applied electric field is reversed, the molecule is reversed and becomes oriented at a position either +θ or −θ inclined. It is needless to say that, because the liquid crystal molecules have polarizing characteristics, when polarizers are mounted on both faces of the above cell, an optical bright-dark condition occurs by reason of the orientation direction of the liquid crystal molecules, and so it is possible for them to function as liquid crystal display panels and as shutter arrays.

A liquid crystals panel utilizing Sm C* liquid crystal as described above, has important features such as a very high response speed at the micro second level, and the ability to hold the pattern for a long period even when the electric field is removed after the display.

The fact that chiral smectic liquid crystals have these characteristics, was first announced by Clark and Lagerwall (Appl, Phys. lett. 36, 899, 1980).

Also they claimed that chiral smectic liquid crystals have another characteristic, i.e. "the desirable threshold value characteristic". The threshold value characteristic in this case, is not the threshold value characteristic towards the effective voltage in a TN type liquid crystal, but is the characteristic only towards the applied voltage value.

But, there are no data to show the existence of a desirable threshold value in our experiments or in any other research institution.

Therefore, we developed a driving method which selects the on-off conditions by the selecting voltage ±Vap having a desirable pulse width at selecting time, and which memorizes the on-off conditions with the AC pulse smaller than the said Vap, the AC pulse having equal positive-negative amplitude as described in Japanese Application No. 232963/83.

FIGS. 6(a), (b) show embodiments of drive wave-form used in the above driving method.

FIGS. 6(a), (b) show respectively the drive wave-forms in which the electric potential relative to the scanning electrodes are +Vap, and −Vap, at the selecting time.

When chiral smectic liquid crystals are driven by said drive wave-form, conditions such as whether the display is good or bad depend greatly on the orientation of the liquid crystals.

The reason is, that the molecule orientation by a uni-axial alignment process is stable, but the situation when voltage is applied and the molecules are parallel to the plate, leads to severe deformation.

FIG. 7 shows the molecule orientation, when a uni-axial alignment process has been carried out on the surface of the two plates.

The layers are thought to be inclined toward the thicker part of the plate, and when referring to one molecule, and when assuming an imaginary cone as in FIG. 3, the molecule is thought to be situated at the top surface of the cone as shown in FIG. 8. The molecules are thought to be parallel to the plate, and situated at the top surfaces of the imaginary cones.

It is necessary to position the molecules parallel to the plate, and to stably position the molecules at one of the two bi-stable molecule positions on the center surface of the imaginary cone.

Conventionally, to obtain this condition, the method claimed by Professor Fukuda of Tokyo Institute of Technology, is known, where the molecule is oriented from the side with a spacer and the like, and then takes the position parallel to the plate on the center surface of the imaginary cone.

But with this method, the spaces holding the side orientation force must be placed in the cell in large numbers, and it is difficult to utilize mass production on an industrial scale.

SUMMARY OF THE INVENTION

The present invention has as an object the provision of an improved smectic liquid crystal panel.

DETAILED DESCRIPTION OF THE INVENTION

As a result of repeating various experiments and extended research, we discovered the following method, which is a method to bring to the molecule the two stable or bi-stable positions parallel to the plate, where a uni-axial alignment treatment is carried on one plate, and a random homogeneous alignment treatment with no directional characteristic or no alignment carried out on the other plate.

Moreover, in this specification, random homogeneous alignment treatment means treatment which aligns the liquid crystal molecules nearly parallel to the plates but does not let the molecules have any definite directional characteristic, but this treatment also includes alignment that lets the molecules have a weak uni-axial alignment characteristic by a weak rubbing treatment and the like.

Onto the film upon which a random homogeneous alignment treatment with no directional characteristic has been carried out, the liquid crystal molecule are attached horizontally random.

Meanwhile, uni-axial alignment treatment on the other plate fixes the molecules horizontally in one direction.

Figure 1:
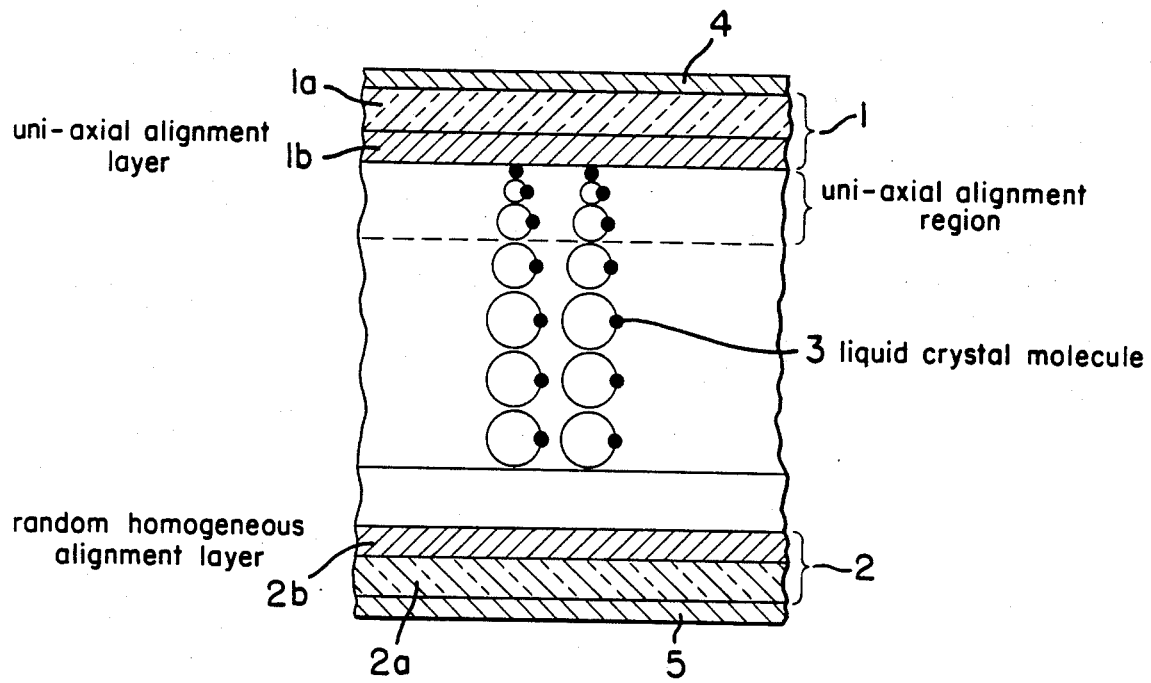
FIG. 1 is a cross-sectional schematic view of an embodiment of the invention.
Figure 2:
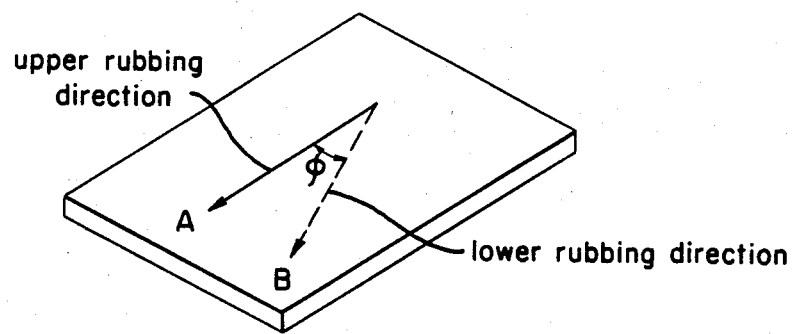
FIG. 2 is a perspective view of a plate showing rubbing directions.
Figure 3:
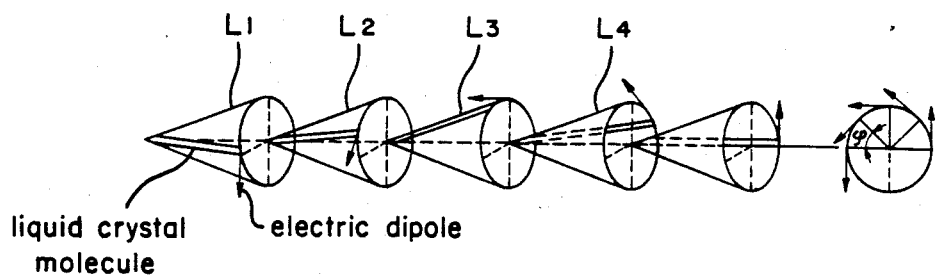
FIG. 3 is a model illustration of molecular arrangement around the spiral axis of Sm C*.
Figure 4A:
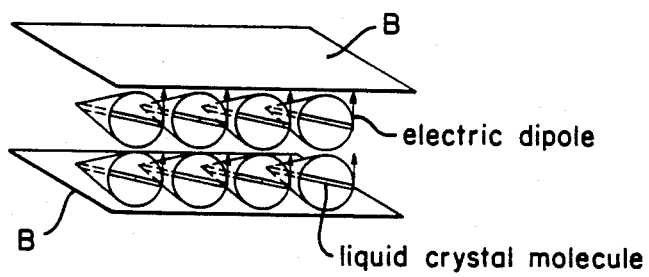
FIGS. 4(a) and (b) are model illustrations showing molecular arrangement between the plates in case of thin cell gap.
Figure 4B:
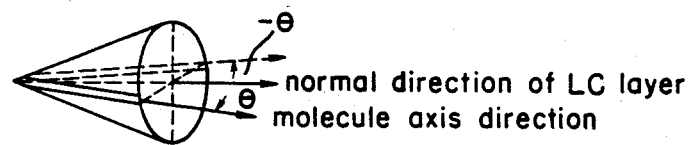
Figure 5:
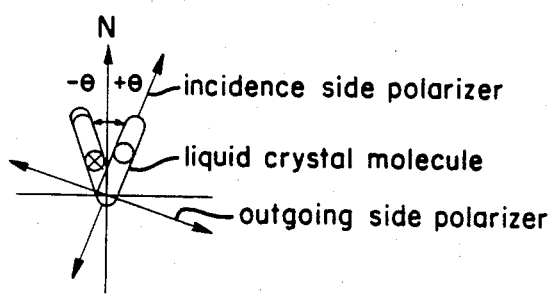
FIG. 5 is an illustration showing the molecular state in respect to the normal of the liquid crystal layer.
Figure 6:
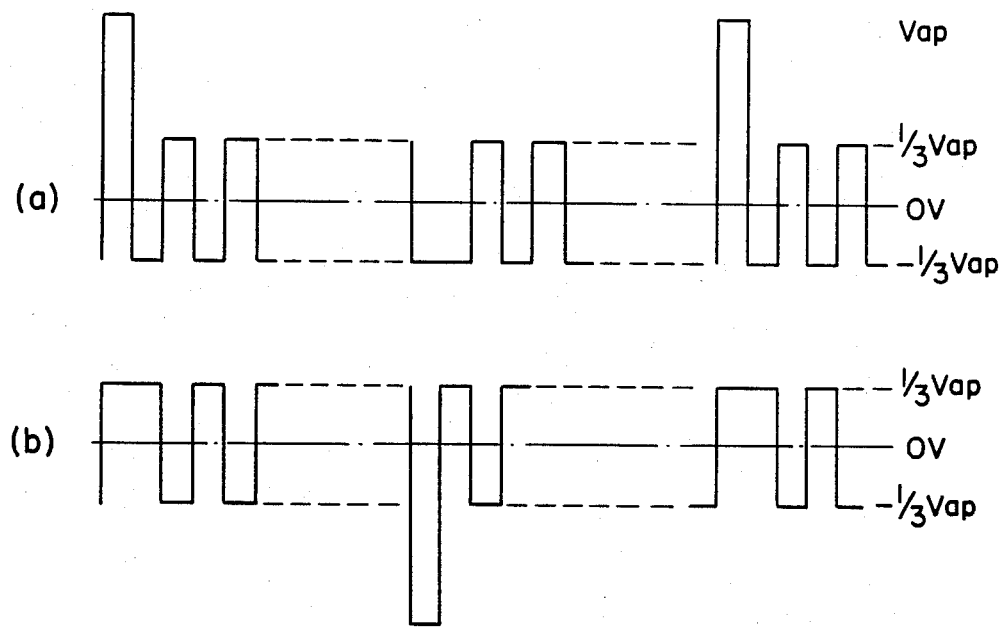
FIGS. 6(a) and (b) show driving wave-forms according to the new driving method which drives a chiral smectic liquid crystal electro-optical device in a time-sharing mode.
Figure 7:
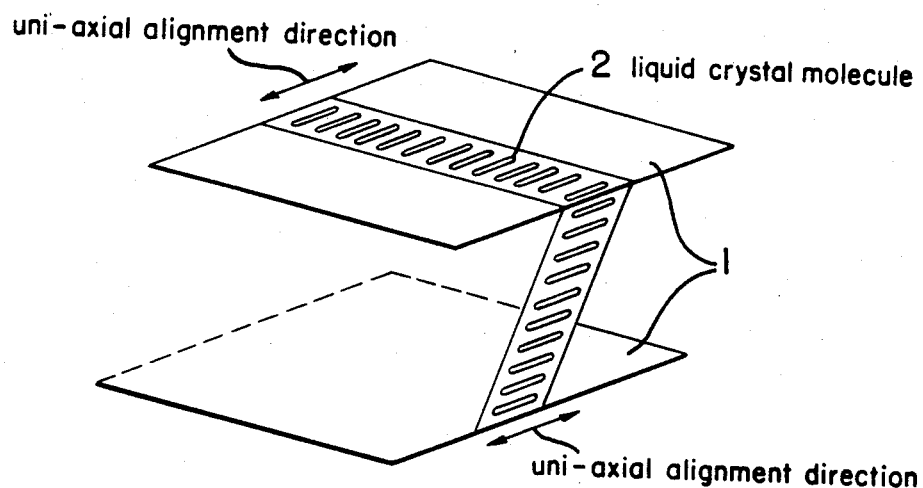
FIG. 7 is a schematic illustration of the molecular arrangement in the case in which a uni-axial alignment treatment is performed on the inner surfaces of the two plates respectively.
Figure 8:
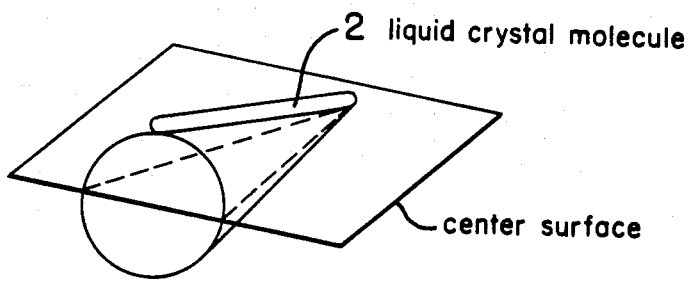
FIG. 8 is an enlarged perspective view of the cone shown in FIGS. 3 and 7.

The alignment condition of the molecules inside the cell in the above orientation is considered to be as follows; FIG. 1 is a typical representation showing the condition of alignment of the molecules in the cell. The liquid crystal molecules 3 hardly move on the uni-axial alignment film 1b. It is assumed that several molecule layers close to the molecule which is in contact with the uni-axial alignment film 1b, either do not move at all or move only a little. On the other hand, several molecule layers which are regulated by the random homogeneous alignment are also thought as not moving much, and are thought to be in a condition close to the random homogeneous alignment in the case where no alignment treatment is carried out. The above uni-axial aligned region is called the uni-axial alignment region, and the random homogeneous aligned region or the region where no aligment treatment is conducted, is called the random homogeneous alignment region.

The former region regulates the orientation direction of the molecule so that the chiral smectic liquid crystal forms a direction-uniformed domain.

Meanwhile, the latter region serves as forming the free interface region between the domain of the latter region and the domain grown by the effect of uni-axial alignment region. "Free" in this case means that the mutual effect or interaction between the upper and lower molecules bordering the interface region is very weak. Therefore, the liquid crystal molecules 3 grown from the uni-axial alignment film 1b can exist in the most stable position without being forced. That position is horizontal to the plate, and is situated on the crossing line of the imaginary cone and the center surface. This bi-stable position is the $\pm\theta$ position.

EMBODIMENT 1

As an embodiment of the uni-axial alignment treatment, there is a method where the poly imide thin film is formed by printing or dipping, and then the rubbing treatment is undergone in one direction. As an embodiment of the random homogeneous alignment treatment, there is the following method, wherein; an Si O$_2$ sputtered plate is immersed in 0.01–5.0 weight % of an organic silane homeotropic alignment compound water solution, washed and dried, then heat treatment is conducted for about 30 minutes at about 300° C.

The suitability of the above driving method depends greatly on the temperature of the heat treatment. 250° C.–300° C. is the most suitable.

As the organic silane homeotropic alignment compound, compounds listed below are suitable;

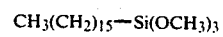
$CH_3(CH_2)_{15}-Si(OCH_3)_3$

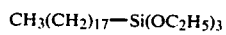
$CH_3(CH_2)_{17}-Si(OC_2H_5)_3$

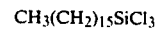
$CH_3(CH_2)_{15}SiCl_3$

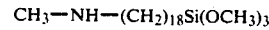
$CH_3-NH-(CH_2)_{18}Si(OCH_3)_3$

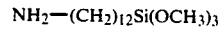
$NH_2-(CH_2)_{12}Si(OCH_3)_3$

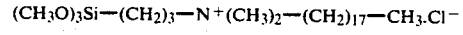
$(CH_3O)_3Si-(CH_2)_3-N^+(CH_3)_2-(CH_2)_{17}-CH_3.Cl^-$

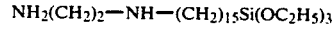
$NH_2(CH_2)_2-NH-(CH_2)_{15}Si(OC_2H_5)_3$

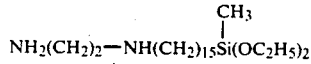
$NH_2(CH_2)_2-NH(CH_2)_{15}Si(OC_2H_5)_2$
               $\overset{|}{CH_3}$

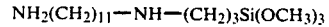
$NH_2(CH_2)_{11}-NH-(CH_2)_3Si(OCH_3)_3$

$CH_3(CH_2)_{10}-\langle\bigcirc\rangle-Si(OC_2H_5)_3$

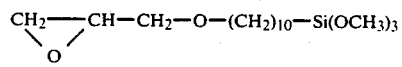
$CH_2\!\!-\!\!CH-CH_2-O-(CH_2)_{10}-Si(OCH_3)_3$
   $\diagdown\!\!\diagup$
      $O$

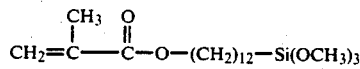
$CH_2=C-C-O-(CH_2)_{12}-Si(OCH_3)_3$
      $|\ \ \ \|$
      $CH_3\ O$

EMBODIMENT 2

The uni-axial alignment treatment is the ame as in embodiment 1. As to the random homogeneous alignment treatment, an organic silane compound is utilized. The alignment treatment with the organic silane compound is as follows; an SiO$_2$ sputtered plate is immersed in 0.01–5.0 weight % of an organic silane compound water solution, then washed and dried.

As the organic silane compound, the following compounds are suitable;

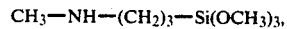
$CH_3-NH-(CH_2)_3-Si(OCH_3)_3$,

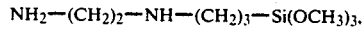
$NH_2-(CH_2)_2-NH-(CH_2)_3-Si(OCH_3)_3$,

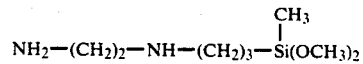
$NH_2-(CH_2)_2-NH-(CH_2)_3-Si(OCH_3)_2$
                              $\overset{|}{CH_3}$

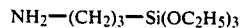
$NH_2-(CH_2)_3-Si(OC_2H_5)_3$

-continued

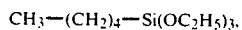

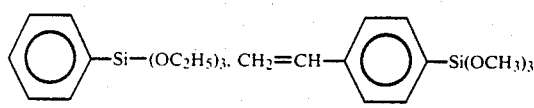

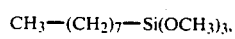

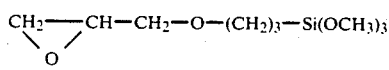

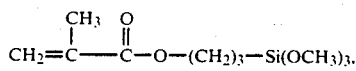

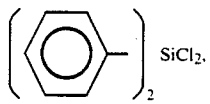

EMBODIMENT 3

Referring to FIG. 1, number 1 in the drawing designates one of the plates that makeup the liquid crystal display panel, on which, after the polyimide thin film is formed on the surface of the transparent electric insulated plate 1a e.g. glass by printing or dipping, the uni-axial alignment film 1b *subjected to rubbing treatment in one direction is formed.*

Number 2 designates the other plate that makes up the cell, on which a random homogeneous alignment film 2b is provided, and, on this film 2b, a rubbing treatment (B direction) is conducted at an angle φ relative to the rubbing treatment direction (A direction) of plate 1 on the surface of the electric insulated transparent plate 2a, wherein the angle φ is the tilt angle of the liquid crystal which is to be enclosed between the plates 1 and 2.

The explanation of the method to form the random homogeneous alignment film is as follows;

First, a film of silicon oxide (SiO₂) is formed on the plate surface by means of vacuum evaporation and the like. Then a uni-axial rubbing treatment is applied in the direction of the uni-axial alignment film carried on the plate, the direction that is, which it moved just by the tilt angle φ degrees against the rubbing direction. Next, this plate is immersed into a water solution of an organic silane homeotropic alignment compound, washed and dried, and the silane homeotropic alignment treatment is conducted on it after which a heat treatment is given to this plate for about one hour at 300° C. As a result, the random homogeneous alignment film biased in uni-axial direction, is formed.

As the above organic silane homeotropic alignment compound, the compounds described in Embodiment 1 can be utilized.

EMBODIMENT 4

After the silane series homeotropic treatment on the plate surface on which a silicone oxide film is formed, a uni-axial rubbing treatment is effected in the axis direction of the uni-axial alignment layer on the other plate, the direction that is off-set by the tilt angle of the liquid crystal in the rubbing direction. By conducting heat treatment of this rubbing treated plate for about one hour at 300° C., a random homogeneous alignment layer which is biased in a uni-axial direction, is formed.

EMBODIMENT 5

After applying a silane series homeotropic alignment compound on the plate which has a silicone oxide film formed on the surface, heat treatment is conducted for about one hour at 300° C., then uni-axial rubbing treatment is effected in the direction just of the tilt angle of the liquid crystal φ degrees. Thereupon, the random homogeneous alignment layer which is biased in the uni-axial direction, is formed.

The uni-axial direction alignment treated plate 1 and the random homogeneous alignment treated plate 2 are positioned having respective alignment treated surfaces with a predetermined gap, and ferro-electric smectic liquid crystals 3 which are blended S-4-O (2-methyl)butyl-resorciliden-4-alkyl n-octyl aniline

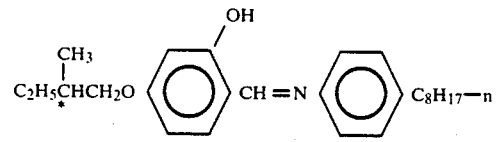

and P-n-octyl phenyl P' 6-methyl octyl oxy benzoate

in equal amounts are enclosed between the plates, and the polarizers 4 and 5 (stated below) are positioned on the surface of plate 1, 2, and thus the liquid crystal panel is constructed.

The above liquid crystal panel not only offers a background with uniform display, but also has a very fast response characteristic at the 300μ second level, when the electric field is applied.

EMBODIMENT 6

In this embodiment, the transparent driving electrode is formed on the electric insulating transparent plate 2a, and on the surface of this transparent plate, a poly imide thin film is applied by printing, dipping and baking without rubbing, and the random homogeneous alignment layer 2b is formed. This random homogeneous alignment layer lets the nearby liquid crystal molecules orient in parallel to the plates, but does not let the molecules have any directional characteristic. Number 1 in the drawing is the other plate that makes up the liquid crystal display panel, and is composed of the transparent electrode which is first formed on the electric insulating transparent plate 1a, and on the surface of 1a, then the polyimide thin film is applied, and the uni-axial alignment film layer 1b is formed after the surface of this thin film is treated by rubbing in one direction, and the alignment treatment in only one direction is affected. These two plates 1,2, are situated with a gap smaller than the spiral pitch of the liquid crystal compound, with the random homogeneous alignment film layer 2b and the uni-axial alignment film layer 1b facing each other in parallel.

Furthermore, in the embodiment, the uni-axial alignment layer and the random homogeneous alignment layer are both formed by the polyimide on the surface of the plate, but, we confirmed that, besides polyimide as the material to be used to form the uni-axial alignment layer, organic films such as poly vinyl alcohol, fluororesin, silane, or a $SiO_2$ oblique vacuum evaporation film can be utilized, and, as the material to form the random homogeneous alignment film of the other plate, besides polyimide, organic films such as epoxy, poly vinyl alcohol, fluororesin, polyurethane, silane, phenol, urea, and inorganic films which are formed by vacuum evaporation of such material as $Si\ O_2$ or $Mg\ F_2$, can be utilized.

We also confirmed that we can utilize the above stated other plate without conducting random homogeneous alignment treatment and any orientation process on it.

As stated above, with our present invention, because we conducted the uni-axial alignment treatment on one of the two plates that compose the liquid crystal panel and the random homogeneous alignment or no alignment process on the other plate, the high-speed response ability of the chiral smectic liquid crystal compound is fully efficient, and the smectic liquid crystal can hold the bi-stable condition and have a good memorizing characteristic, and by initially orienting the liquid crystal molecule in the direction which responds to the uni-axial alignment direction, it is possible to provide a liquid crystal panel having an uniform background.

What is claimed is:

1. A ferro-electric liquid crystal electro-optical device comprising: two plates having thereon driving electrodes, the inner surface of one of said two plates having a uni-axial alignment characteristic and the inner surface of the other of said two plates having a random homogeneous alignment characteristic, and ferro-electric liquid crystal material sandwiched between said plates.

2. A ferro-electric liquid crystal electro-optical device as claimed in claim 1, wherein said uni-axial alignment characteristic is obtained by rubbing a thin layer made of at least one of polyimide, poly vinyl alcohol, fluorine-containing polymers, silane and $SiO_2$, said layer being provided on the inner surface of one of said two plates.

3. A ferro-electric liquid crystal electro-optical device as claimed in claim 1, wherein said random homogeneous alignment characteristic is obtained by giving a homeotropic alignment treatment to the inner surface of the other of said two plates and thereafter applying a heat treatment.

4. A ferro-electric liquid crystal electro-optical device as claimed in claim 3, wherein said random homogeneous alignment characteristic is biased in a uni-axial direction by rubbing the inner surface of the other plate prior to saaid heat treatment.

5. A ferro-electric liquid crystal electro-optical device as claimed in claim 3, wherein said random homogeneous alignment characteristic is biased in a uni-axial direction by rubbing the inner surface of the other plate after said heat treatment.

6. A ferro-electric liquid crystal electro-optical device as claimed in claim 3, wherein said random homogeneous alignment characteristic is biased in a uni-axial direction by rubbing the inner surface of the other plate prior to said homeotropic alignment treatment.

7. A ferro-electric liquid crystal electro-optical device as claimed in claim 1, wherein said random homogeneous alignment characteristic is biased in a uni-axial direction.

8. A ferro-electric liquid crystal electro-optical device as claimed in claim 7, wherein the angle between the direction of the bias and the direction of the uni-axial alignment on said one of the two plates is approximately the tilt angle $\phi$ of the liquid crystal.

9. A ferro-electric liquid crystal electro-optical device as claimed in claim 1, wherein said random homogeneous alignment characteristic is obtained by providing a layer made of at least one of polyimide, epoxy, poly vinyl alcohol, fluorine-containing polymers, polyurethane, silane, phenol, urea, $SiO_2$ and $Mg\ F_2$, on the inner surface of the other plate, without rubbing.

10. A ferro-electric liquid crystal electro-optical device as claimed in claim 1, wherein said random homogeneous alignment characteristic is obtained by providing no alignment layer on the inner surface of the other plate.

11. A ferro-electric liquid crystal electro-optical device as claimed in claim 1, where the ferro-electric liquid crystal comprises a chiral smectic liquid crystal.

12. A ferro-electric liquid crystal electro-optical device as claimed in claim 1, where the device comprises a display device.

13. A ferro-electric liquid crystal electro-optical device as claimed in claim 1, where the device comprises a shutter for printers.

14. A smectic liquid crystal electro-optical device comprising: ferro-electric chiral smectic liquid crystal molecules having a certain spiral pitch; and a pair of plates spaced apart from each other to define therebetween a gap smaller than the spiral pitch and sandwiching between the opposed inner surface thereof the liquid crystal molecules, one of the plates exhibiting a uni-axial alignment characteritic on the inner surface thereof, and the other of the plates exhibiting a random homogeneous alignment characteristic on the inner surface thereof.

15. A smectic liquid crystal electro-optical device according to claim 14; wherein the alignment characteristics of the two plates are jointly effective to create therebetween a liquid crystal region in which the liquid crystal molecules can be switched between bi-stable orientations under the influence of an applied electric field.

16. A smectic liquid crystal electro-optical device according to claim 14; wherein the alignment characteristics of the two plates are effective to produce only a very weak mutual interaction between the domain of liquid crystal molecules immediately adjacent the plate inner surface exhibiting the uni-axial alignment characteristic and the domain of liquid crystal molecules immediately adjacent the plate inner surface exhibiting the random homogeneous alignment characteistic.

17. A smectic liquid crystal electro-optical device according to claim 16; wherein the very weak mutual interaction is sufficiently weak to create between the two aforesaid domains a liquid crystal region in which the liquid crystal molecules can be switched between bi-stable orientations under the influence of an applied electric field.

18. A ferro-electric liquid crystal electro-optical device comprising: ferro-electric liquid crystal; a pair of plates having driving electrodes on the inner surfaces thereof and being disposed in spaced apart relation from each other with the ferro-electric liquid crystal sandwiched therebetween, at least one of the plates being transparent; one of the plates exhibiting a uni-axial alignment characteristic on the inner surface thereof, the other of the plates exibiting a random homogeneous alignment characteristic on the inner surface thereof, the alignment characteristics of the two plates creating therebetween a liquid crystal region in which the liquid crystal molecules can establish bi-stable alignments; and drive means connected to the driving electrodes for selecting one of the bi-stable alignments by applying a voltage of $\pm V_{ap}$ having a predetermined pulse width and for holding the selected bi-stable alignment by applying AC pulses having an amplitude smaller than the voltage $V_{ap}$.

19. A ferro-electric liuid crystal electro-optical device according to claim 18; wherein the alignment characteristics of the two plates are effective to produce only a very weak mutual interaction between the domain of liquid crystal molecules immediately adjacent the plate inner surface exhibiting the uni-axial alignment characteristic and the domain of liquid crystal molecules immediately adjacent the plate inner surface exhibiting the random homogeneous alignment characteristic.

* * * * *